(12) United States Patent
Goodson, II et al.

(10) Patent No.: US 12,400,043 B2
(45) Date of Patent: Aug. 26, 2025

(54) SECURITY FOR POWER SUPPLY UNIT MICROCONTROLLERS

(71) Applicant: HEWLETT PACKARD ENTERPRISE DEVELOPMENT LP, Spring, TX (US)

(72) Inventors: Stewart Gavin Goodson, II, Cypress, TX (US); Robin Kelley Schrader, Spring, TX (US); Daniel Alan Humphrey, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 155 days.

(21) Appl. No.: 18/329,118

(22) Filed: Jun. 5, 2023

(65) Prior Publication Data

US 2024/0403496 A1    Dec. 5, 2024

(51) Int. Cl.
| | |
|---|---|
| *G06F 21/81* | (2013.01) |
| *G06F 21/57* | (2013.01) |
| *G06F 21/60* | (2013.01) |
| *G06F 21/64* | (2013.01) |

(52) U.S. Cl.
CPC .......... *G06F 21/81* (2013.01); *G06F 21/572* (2013.01); *G06F 21/602* (2013.01); *G06F 21/64* (2013.01)

(58) Field of Classification Search
CPC .......... G06F 21/44–445; G06F 21/51; G06F 21/57–575; G06F 21/602; G06F 21/604; G06F 21/64; G06F 21/81
See application file for complete search history.

(56) References Cited

U.S. PATENT DOCUMENTS

| 10,983,785 B1* | 4/2021 | Bryan .................. G06F 8/65 |
| 2015/0012737 A1 | 1/2015 | Newell |
| 2016/0224048 A1* | 8/2016 | Rooyakkers .......... G09C 1/00 |
| 2020/0021733 A1 | 1/2020 | Liu |
| 2020/0327259 A1* | 10/2020 | Aubineau ............ H04L 9/3271 |
| 2022/0021531 A1* | 1/2022 | Zach ................... G06F 21/86 |

OTHER PUBLICATIONS

European search report received for EP Application No. 24180042, mailed on Feb. 11, 2025, 11 pages.

* cited by examiner

*Primary Examiner* — Kevin Bechtel
(74) *Attorney, Agent, or Firm* — Jones Robb PLLC

(57) ABSTRACT

A power supply unit (PSU) comprises power conversion circuitry to convert input power into output power for an electronic system, microcontrollers to control operations of the power conversion circuitry, and a secure element communicably connected to a first microcontroller. The secure element and the microcontrollers are all paired together with each storing shared pairing information. The secure element and the microcontrollers comprise security logic. The security logic may be configured to, in response to a power on sequence being initiated, validate the secure element and the microcontrollers based on the shared pairing information, and make completion of the power on sequence conditional on successful validation. The security logic may be configured to, in response to receiving a new firmware image for updating one of the microcontrollers, use the secure element to validate the new firmware image and make acceptance of the new firmware image conditional on successful validation.

15 Claims, 9 Drawing Sheets

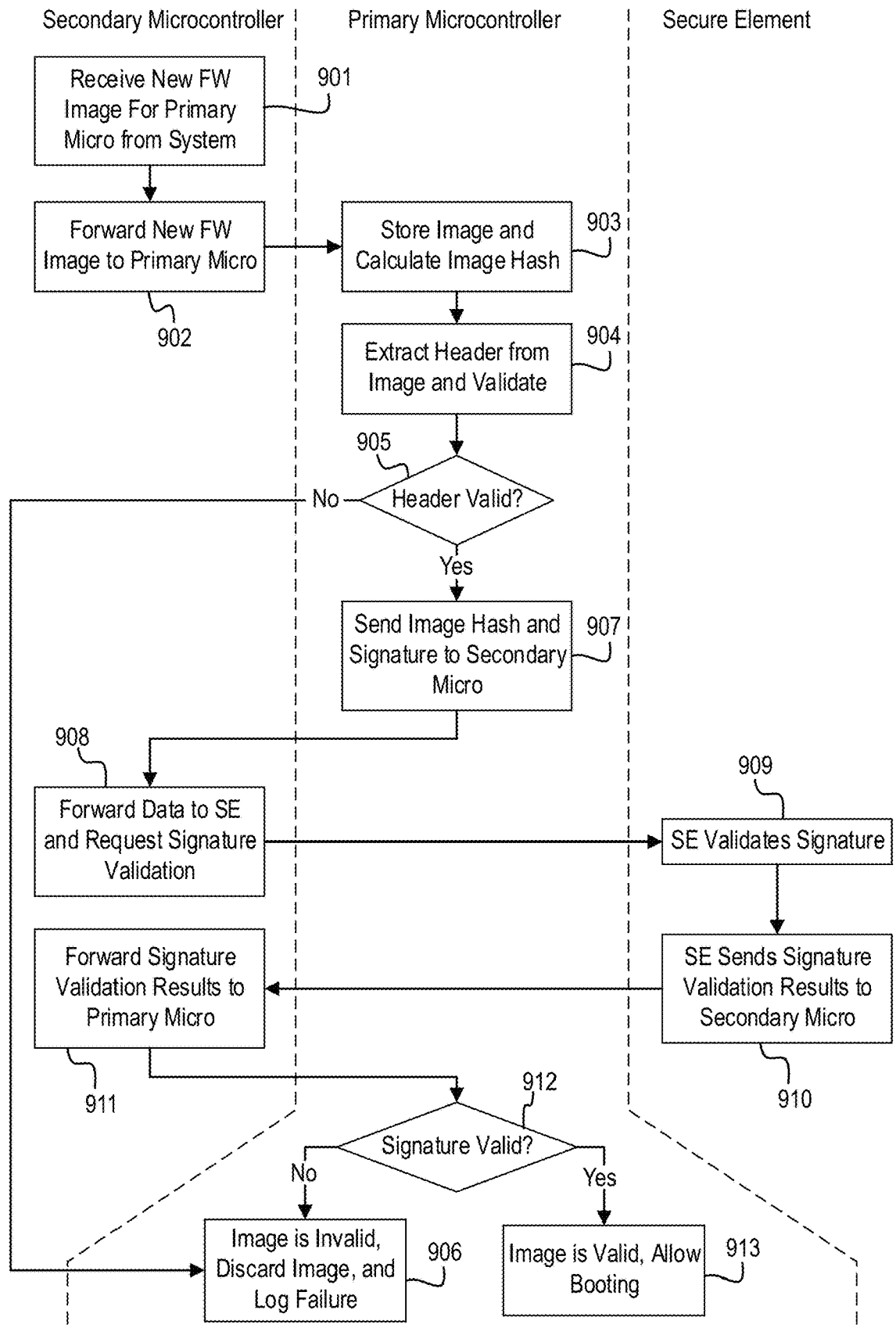

SECURITY FOR POWER SUPPLY UNIT MICROCONTROLLERS

INTRODUCTION

Information technology systems, such as computing systems, networking systems, etc., often comprise one or more power supply units (PSUs). A PSU is generally configured to convert input power of one form into another form more suitable for the system of which it is a part—for example, increasing or decreasing the voltage and/or changing input alternating current (AC) into output direct current (DC). The PSU is generally provided as a module of the larger system which can be removably coupled to the other components of the system, such as to a main system board (e.g., motherboard). PSUs are often divided into a primary side which comprises circuitry that receives the input power and executes a first stage of conversion and a secondary side which comprises circuitry which executes a second stage of conversion and outputs the converted power. The primary and secondary sides are usually galvanically isolated from one another (i.e., no current flows between the primary and secondary sides, although energy and information are exchanged via capacitive couplings, inductive couplings, optical couplings, and/or other couplings). The PSU generally comprises a number of microcontrollers that control the operations of the PSU. The microcontrollers of the PSU generally include at least a primary microcontroller that is part of, and controls the functions of, the primary side and a secondary microcontroller that is part of, and controls the functions of, the secondary side.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings:

FIG. 9 is a process flow chart illustrating a eighth example method performable by another example implementation of security logic of the power supply unit of FIG. 1.

DETAILED DESCRIPTION

Figure 1:
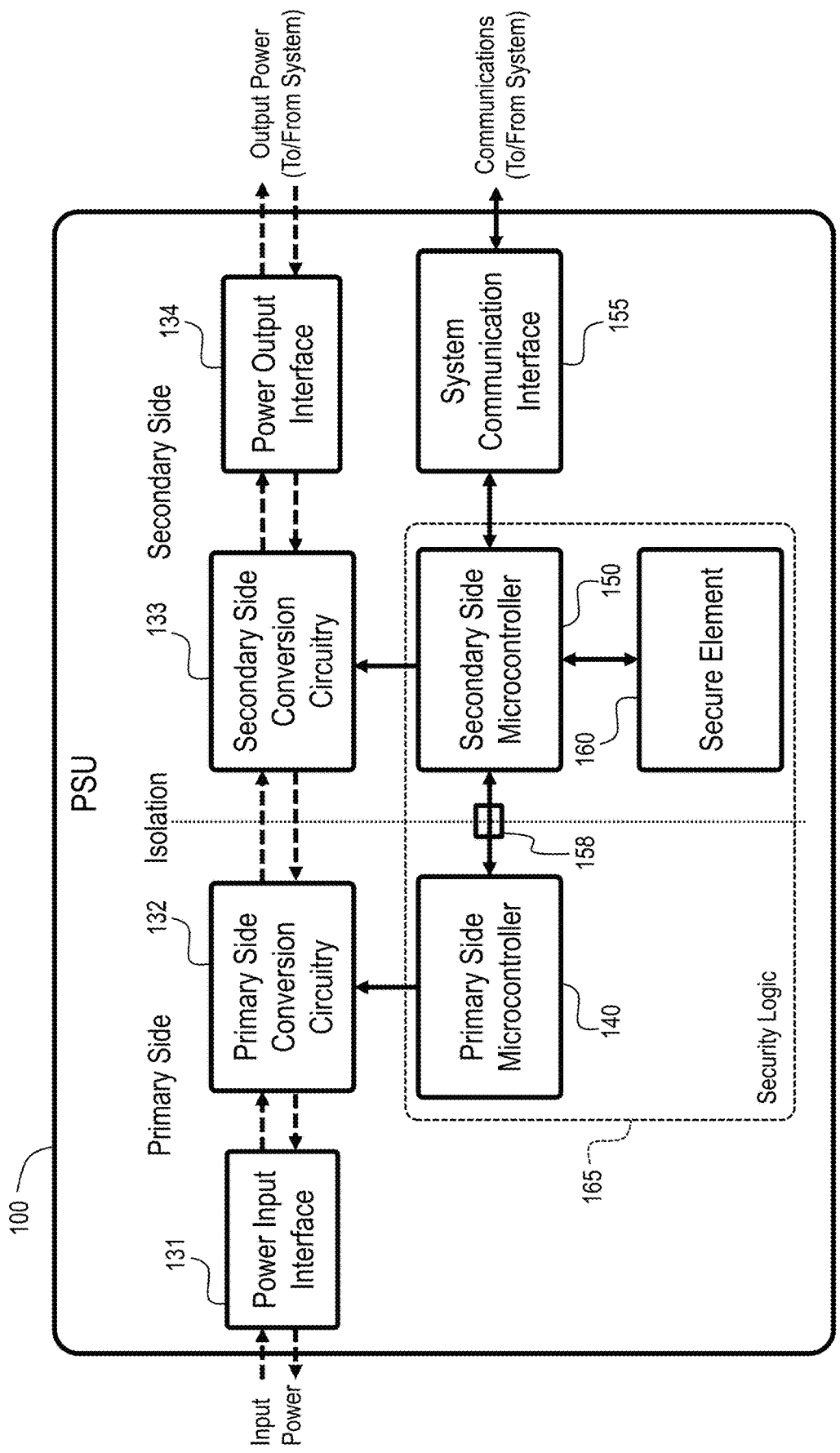
FIG. 1 is a block diagram illustrating an example power supply unit.

Information technology (IT) systems generally comprise a variety of security measures to combat malicious cyberattacks, counterfeiting, and/or unauthorized changes to system configuration. However, traditionally such security measures have been focused on the major software and hardware components of the system, such as software applications, the operating system, the processors, the system controller (e.g., baseboard management controller (BMC)), or the like. But other components have generally received less attention when it comes to security measures, and in particular the PSU generally comprises little or no security measures. Thus, in many systems it may be possible, for example, for a malicious actor to gain control over the microcontrollers of the PSU (e.g., via a malicious change to the existing firmware or an unauthorized firmware update), which could allow the malicious actor to, for example, cut power to the electronic system in a denial-of-service attack. In addition, the lack of security in PSUs may also allow for a counterfeit PSU to be passed off as one produced by the manufacturer of the IT system. Additionally, the lack of security in the PSU may allow a non-malicious actor (e.g., an authorized user of the system) to, intentionally or unintentionally, change the configuration of the PSU in a way that may be harmful or which is otherwise undesirable. Thus, it may be desirable to provide security measures in the PSU to combat these threats.

But providing security measures in the PSU can be challenging because the microcontrollers of the PSU generally are not capable of performing all the needed security functions. PSU microcontrollers tend to be relatively inexpensive and have limited capabilities. For example, PSU microcontrollers may not have sufficient available storage space to store all the cryptographic information (e.g., keys, certificates, etc.) that might be needed for a security scheme. In addition, some PSU microcontrollers may not be capable of performing certain cryptographic tasks, such as signature verification, and even if a PSU microcontroller could in theory be programmed to perform certain cryptographic functions, they may be unacceptably slow at these tasks due to their limited processing power and not being specialized in such tasks. Moreover, while it may be possible in theory to produce a new microcontroller that is capable of performing all the needed cryptographic tasks, such a microcontroller would likely be relatively expensive, and thus may not be suitable for use in some PSUs, which tend to be very cost sensitive.

Thus, examples disclosed herein provide a technical solution to the above-mentioned problems, which comprises providing a secure element in the PSU to handle certain cryptographic functions and using the secure element in conjunction with the PSU microcontrollers to secure the microcontrollers against a number of possible attacks. In particular, in some examples the PSU microcontrollers and secure element may be paired with one another in a secure setting (e.g., at the factory during manufacture), and then subsequently, whenever they are powered on, the PSU microcontrollers may validate the identities of each other and the secure element, based on cryptographic information (e.g., keys) generated by the secure element, and the completion of the power on sequence may be made conditional on the success of the validation (i.e., if any of the microcontrollers or the secure element are not validated, then completion of the power on sequence is prevented and an error may be signaled). In this manner, the unauthorized replacement of the secure element or any one of the microcontrollers with another device, which could potentially be a compromised and/or counterfeit device, can be detected by the other devices in the system and protective actions can be taken (e.g., an error may be signaled, and completion of the power on sequence may be prevented).

In addition, in some examples, whenever they are powered on, the PSU microcontrollers may validate the firmware images of all the microcontrollers, again based at least in part on cryptographic information generated by the secure element, and the completion of the power on sequence may be made conditional on the validation. In this manner, an unauthorized change in the firmware of a microcontroller can be detected and protective actions taken. Such an unauthorized change in the firmware may occur, for example, by someone physically accessing the pins of the microcontroller to reprogram it.

Furthermore, in some examples, the microcontrollers may be configured to use the secure element to validate the signature of any firmware updates which are received through the appropriate channels (e.g., from the BMC of the system), with the acceptance of the firmware update being made conditional on the validation. In this manner, the microcontrollers may accept only genuine and authorized firmware updates, thus guarding against the possibility of being tricked into accepting unauthorized firmware merely because the firmware has been distributed through the appropriate channels (e.g., is received from the system BMC). Unauthorized firmware updates could possibly be received from the system BMC if, for example, the system BMC has been replaced with a counterfeit part or has otherwise been compromised.

The secure element may be a relatively inexpensive component. Thus, the increase in the overall cost of the PSU due to the addition of the secure element may be much smaller than the increase in the overall cost of the PSU that would result from using a hypothetical new PSU microcontroller that is be capable of performing all of the security functions. Moreover, the secure element is specialized in performing cryptographic functions, such as signature validation and other functions, and thus would be much faster at performing these functions than the hypothetical new PSU microcontroller. Thus, examples disclosed herein not only increase the security of the PSU, but do so in a cost effective manner with minimal impact on performance.

Turning now to the figures, various devices, systems, and methods in accordance with aspects of the present disclosure will be described.

FIG. 1 is a block diagram conceptually illustrating an example power supply unit (PSU), in the form of PSU 100. The PSU 100 may be for use in IT equipment such as a computing device (e.g., server), network device (e.g., network switch), etc. The PSU 100 illustrated in FIG. 1 and described below is an example only, and implementations of the PSU 100 may have different numbers and arrangements of the illustrated components and may also include other parts that are not illustrated. Moreover, FIG. 1 is not intended to illustrate specific shapes, dimensions, or other structural details accurately or to scale.

As shown in FIG. 1, the PSU 100 comprises a primary side and a secondary side which are galvanically isolated from one another, with the primary side comprising a power input interface 131, primary side conversion circuitry 132, and a primary side microcontroller 140, and with the secondary side comprising secondary side conversion circuitry 133, a power output interface 134, a secondary side microcontroller 150, a system communication interface 155, and a secure element 160. The PSU 100 also comprises security logic 165, which executes various operations for enhancing the security of the PSU 100. The security logic 165 comprises the secure element 160 together with portions of the internal logic (e.g., programming) of the primary side microcontroller 140 and portions of the internal logic (e.g., programming) of the secondary side microcontroller 150. These components of the PSU 100 will all be described in greater detail in turn below.

The power input interface 131 is configured to be connected to an external power source, such as a power cord or power bus, to receive input power. For example, the power input interface 131 may comprise an electrical socket configured to receive a connector (e.g., plug) of a power cord. Other types of power input interfaces are well known to those of ordinary skill in the art and any such input interface may be used as the power input interface 131.

The power output interface 134 is configured to be connected to one or more components of an electronic system, such as to the main system board (e.g., motherboard) of a computing device or networking device, to supply output power to the electronic system. For example, the power output interface 134 may comprise a PCB edge-connector (also sometimes called a PCB gold-finger connector) configured to be removably inserted into a complementary socket of the main system board. As another example, the power output interface 134 may comprise one or more power cables and/or sockets to receive a power cable, with such cables being connected to complementary sockets on the main system board. As another example, the power output interface 134 may comprise pins configured to mate with complementary sleeves attached to the main system board. Other types of power output interfaces are well known to those of ordinary skill in the art and any such output interface may be used as the power output interface 134.

The general path of electrical power flowing between the input power and the output power is indicated in FIG. 1 using dash-lined arrows, while analog or digital communication channels are illustrated in FIG. 1 using solid-lined arrows. Note that the electrical power pathways illustrated in FIG. 1 are general and not intended to be exhaustive. In practice, there may be multiple different electrical power circuits (also called "rails") (not illustrated) that carry multiple different power signals (e.g., a 12V main system power signal, a 3.3V "standby" power signal, etc.) along various paths. Moreover, although not shown, electrical power is also provided from the conversion circuitry 132 and/or 133 to the other components of the PSU 100 (such as the microcontrollers 140 and 150 and secure element 160) via one or more such rails.

The system communication interface 155 comprises a communication channel that is or can be communicably connected to one or more other components of the remainder of the electronic system, such as to a system controller (e.g., baseboard management controller (BMC) or other similar device), to allow for communications to be passed between the PSU 100 and the remainder of the system. For example, the system communication interface 155 may comprise a PCB edge connector configured to be received in a complementary socket of the system (e.g., a socket on the main system board). As another example, the system communication interface 155 may comprise one or more communication cables and/or connectors for receiving communications cables configured to be connected to complementary sockets of the system.

In some examples, the system communication interface 155 and the other components of the PSU 100 may utilize the Inter-Integrated Circuit (I2C) (also referred to as IIC or I²C) communication protocol (or any of related protocols derivative therefrom, such as SMBus, PMBus, IPMB, TWI, TWSI, I3C, etc.). However, other communication protocols are well known to those of ordinary skill in the art (for example, without limitation, SPI, CAN, USB, etc.), and any such communication protocol may be used by the system communication interface 155 and other components for communication. The system communication interface 155 may, but does not necessarily have to, use the same communication protocol for external communications (e.g., with the system BMC) as is used for internal communications between the components of the PSU 100. In examples in which different communications protocols are used for external and internal communications, the system communication interface 155 may further comprise circuitry to convert the communications signals between the protocols, as would be familiar to those of ordinary skill in the art.

The primary side conversion circuitry 132 and secondary side conversion circuitry 133 may convert the input electrical power received by the power input interface 131 into the output power output by the power output interface 134. For example, the primary side conversion circuitry 132 may convert the input power (e.g., mains AC or high-voltage DC) into a bulk DC voltage (e.g., 400 V), which is stored on a so-called bulk capacitor of the primary side conversion circuitry 132, and the secondary side conversion circuitry 133 may convert the bulk voltage into one or more lower voltage DC power signals (e.g., 12V, 3.3V, etc.) suitable for use by the remainder of the electronic system. The primary side conversion circuitry 132 and the secondary side conversion circuitry 133 may be isolated from one another so that no current directly flows therebetween, but they may be coupled inductively—for example, the secondary side conversion circuitry 133 may comprise a transformer (not shown) that inductively couples the two circuits. The primary and secondary side conversion circuitries 132 and 133 may also comprise additional elements, such as passive and/or active overcurrent and/or overvoltage protection elements (e.g., a fuse, a transorb, etc.), power factor correction circuitry, and so on. Conversion circuitry of a PSU is familiar to those of ordinary skill in the art, and thus detailed description of these aspects of the primary and secondary conversion circuitries 132 and 133 is omitted herein.

The primary side conversion circuitry 132 may be controlled by the primary side microcontroller 140 and the secondary side conversion circuitry 133 may be controlled by the secondary side microcontroller 150 (collectively referred to as microcontrollers 140 and 150). The microcontrollers 140 and 150 may each comprise processing circuitry (e.g., a processor) and data storage circuitry (e.g., flash memory), as well as firmware stored in the data storage circuitry that can be executed by the processing circuitry to cause performance of the various operations of the microcontrollers 140 and 150. Power microcontrollers in general are well known to those of ordinary skill in the art, and in particular those of ordinary skill in the art would be familiar with the configuration of such power microcontrollers to control operations of power conversion circuitry, and thus further detailed description of these aspects of the microcontrollers 140 and 150 is omitted herein. Although only two microcontrollers 140 and 150 are illustrated, in practice the PSU 100 may have any number of microcontrollers equal to or greater than two.

In some examples the secondary side microcontroller 150 is communicably connected to the system communication interface 155, but the primary side microcontroller 140 is not. Therefore, in these examples, messages between the primary side microcontroller 140 and the external system are routed through the secondary side microcontroller 150. Because the primary side microcontroller 140 and the secondary side microcontroller 150 are electrically isolated from one another, they communicate with one another via an isolator 158 disposed therebetween (an isolator may also be referred to as a coupler). The isolator 158 is a device which maintains galvanic isolation between two terminals thereof while allowing information to be passed therebetween. One example of such an isolator is an opto-isolator (also called an opto-coupler) which uses light to pass information between the two electrically isolated sides. Any other type of isolator (coupler) may be used as the isolator 158.

In some examples in which more than one secondary side microcontroller is present (in addition to the secondary microcontroller 150), just the secondary microcontroller 150 is communicably connected directly to the system communication interface 155 but the others are not. Thus, in such examples, communications between the other microcontrollers and the external system are passed through the secondary side microcontroller 150. In other examples in which more than one secondary side microcontroller is present (in addition the secondary microcontroller 150), some or all of these additional secondary side microcontrollers can also be communicably connected directly to the system communication interface 155, and thus in these examples communications between these microcontrollers and the external system may not need to pass through the microcontroller 150 (although communications between the primary side microcontrollers and the external system may still need to pass through one or more of the secondary side microcontrollers).

In addition to the microcontrollers 140 and 150 being configured to control the operations of the conversion circuitry 132 and 133 as described above, the microcontrollers 140 and 150 may also have additional programming configured to cause the microcontrollers 140 and 150 to perform operations related to enhancing the security of the PSU 100. This additional programming of the microcontrollers 140 and 150 for security operations, together with the secure element 160, forms the security logic 165 mentioned above. As used herein, "logic" refers to dedicated hardware, software instructions (including firmware) stored in memory and coupled with a processor capable of executing the instructions, or some combination of these. Thus, the security logic 165 comprises instructions stored in the microcontrollers 140 and 150 (e.g., as part of the firmware thereof) and/or in the secure element 160 and executable by processors thereof to cause various operations described herein to be performed, dedicated hardware configured to perform (or facilitate the performance of) the operations, or some combination of these. In some examples, the microcontrollers 140 and 150 may be formed from commercially available PSU microcontrollers which have been further programmed with additional instructions corresponding to security logic 165. The operations associated with security logic 165 are described in greater detail below in relation to FIGS. 2-9.

The secure element 160 comprises a secure, tamper-resistant device (e.g., chip, microcontroller, etc.) that is configured to securely store sensitive cryptographic information, such as keys and certificates, and to perform cryptographic functions, such as key provisioning and digital signature authentication. In some examples, the secure element 160 may be configured to store the cryptographic information in a way that makes it difficult or infeasible for an attacker to obtain the information, even if the attacker obtains physical control over the secure element 160 (for example, by the secure element 160 physically destroying the memory holding the information in response to an unauthorized physical intrusion). Various commercially available secure elements exist, which may be used as the secure element 160. Some non-limiting examples of secure elements that could be used as the secure element 160 include the STSAFEA110 produced by ST, the TA100 produced by Microchip, or other similar secure elements produced by a multiplicity of other vendors. The secure element 160 may be configured to perform various operations as part of the security logic 165, as described in greater detail below in relation to FIGS. 2-9.

As shown in FIG. 1, in some examples the secure element 160 is disposed on the secondary side of the PSU 100 and is communicably connected to the secondary side microcontroller 160. Moreover, the secure element 160 is not coupled directly to the system communication interface 155, and thus does not communicate directly with the external system. Instead, communications between the external system and the secure element 160 may be routed through the secondary side microcontroller 150 (or through one of the secondary microcontrollers if more than one are present). Furthermore, the secure element 160 is not coupled directly to the primary side microcontroller 140 (or to other primary or secondary microcontrollers if more than two microcontrollers are present), but is instead connected just to the secondary microcontroller 150. Thus, communications between the primary microcontroller 140 (or any other microcontrollers, if more are present) and the secure element 160 may also be routed through the directly connected secondary side microcontroller 150.

Although in the illustrated example the secure element 160 is disposed on the secondary side and coupled to the secondary microcontroller 150, in some examples the secure element 160 is disposed on the primary side and is connected to the primary side microcontroller 140. In such examples, security operations described herein (e.g., in relation to FIGS. 2-9) as being performed by the secondary microcontroller would instead be performed by the primary microcontroller, and vice versa (with the exception that the secondary microcontroller may continue to forward information received from the external system to the primary microcontroller and/or secure element, regardless of which side the secure element is part of).

Turning now to FIGS. 2-9 the methods 200, 300, 400, 500, 600, 700, 800, and 900 will be described. The methods 200 through 900 may be performed by, or using, various implementations of the PSU 100; specifically, methods 200 through 900 comprises various operations which the microcontrollers 140 and 150 and/or the secure element 160 may be configured to perform in various implementations of the PSU 100. The microcontrollers 140 and 150 and/or the secure element 160 may be configured to perform these operations by virtue of corresponding computer program instructions being stored in the microcontrollers 140 and 150 and/or the secure element 160, and/or by virtue of dedicated hardware for performing the operations being provided therein. Moreover, various combinations of these operations, when instantiated in the microcontrollers 140 and 150 and/or the secure element 160 in the form of stored instructions and/or dedicated hardware, constitute example configurations of the security logic 165.

Note that methods 200 to 900 are not mutually exclusive, and the example implementations of the PSU 100 and security logic 165 reflected in the methods 200 to 900 are also not mutually exclusive. In particular, many of the methods reflect specific example implementations of operations of the other methods. In other words, in some cases two methods may reflect generally similar subject matter but set forth at different levels of generality, with one of the methods being more general and another method being one specific example of some part of the more general method. For example, the method 400 of FIG. 4 comprises an example implementation of operations 262 and 263 in method 200 of FIG. 2, while the methods 800 and 900 of FIGS. 8 and 9 comprise example implementations of operations 264 and 265 in the method 200. These relationships will be described in greater detail as the methods are described in turn below.

Note that in FIGS. 2-9, the initialism SE is used to refer to the secure element 160 and the abbreviations "micro," "Sec.," and "Pri." are used to refer to microcontroller, secondary, and primary, respectively.

Figure 2:
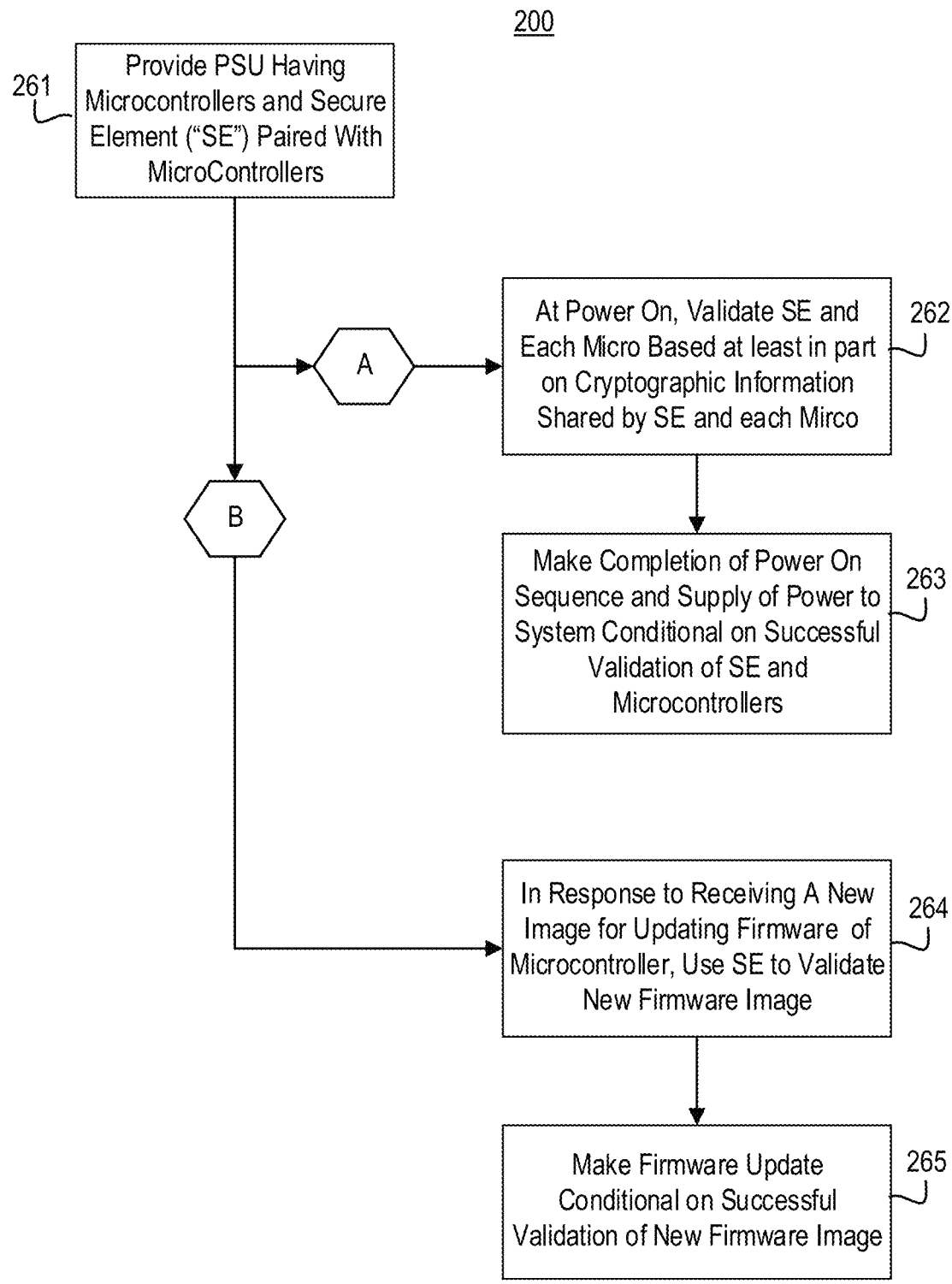
FIG. 2 is a process flow chart illustrating a first example method performable by an example implementation of security logic of the power supply unit of FIG. 1.

FIG. 2 illustrates a method 200. Method 200 begins at operation 261, which comprises providing a PSU (e.g., PSU 100) having microcontrollers (e.g., microcontrollers 140 and 150) and a secure element ("SE") (e.g., secure element 160) which are paired with one another. The microcontrollers and SE being paired with one another means that the microcontrollers and SE each store cryptographic information (e.g., keys), which was generated by the SE and shared at the time of pairing with the microcontrollers, and which allows each of these to validate the others. This shared cryptographic information may be referred to hereinafter as pairing information. One example implementation of operation 261 is found in method 300 illustrated in FIG. 3, which is described below.

The method 200 then continues to either (or both) of sequences A and B. Sequence A comprises operations 262 and 263. Sequence B comprises operations 264 and 265. Some examples of method 200 comprise sequence A, other examples comprise sequence B, and still others comprise both sequences A and B. Similarly, some example implementations of the security logic 165 comprise computer program instructions and/or hardware corresponding to sequence A, other example implementations of the security logic 165 comprise computer program instructions and/or hardware corresponding sequence B, and still other example implementations of the security logic 165 comprise computer program instructions and/or hardware corresponding to both sequence A and sequence B. In examples in which both sequence A and sequence B are performed, sequences A and B may be performed in any order (including concurrently).

Considering sequence A, operation 262 comprises, at power on (i.e., at initiation of a power on sequence), validating the secure element (e.g., secure element 160) and each of the PSU microcontrollers (e.g., primary and secondary microcontrollers 140 and 150) based at least in part on cryptographic information shared by the secure element and each of the microcontrollers. In some examples, this shared cryptographic information may include the pairing information described above in relation to operation 261. In some examples, this shared cryptographic information may be information generated based on the pairing information, such as a message authentication code (MAC) generated based on the pairing information. In some examples, this shared cryptographic information may be a random number generated by the secure element and shared with the microcontrollers. In some examples, multiple of the aforementioned types of cryptographic information are used together for various purposes. Each microcontroller may validate each of the other microcontrollers, and the microcontroller that is directly connected to the secure element (e.g., the secondary microcontroller 150) may validate the secure element. In addition, the secure element may validate the microcontroller that is directly connected to it (e.g., the secondary microcontroller 150). In this manner, all of the components that make up the security logic are validated by at least one other of the components.

In some examples, the validating performed by the microcontrollers and secure element as part of operation 262 includes validating the identities of the microcontrollers and secure element. In this context, validating the identities of the microcontrollers and secure element means verifying that these components are part of the same group of components which were previously paired together (as described in relation to operation 261). This validation may comprise, for example, the microcontrollers and secure element sharing cryptographic information with one another which only the paired components should have access to. This cryptographic information may comprise, or may be generated based upon, the pairing information. Some example implementations of validating the components identities as part of the operation 262 are found in methods 400 through 700 illustrated in FIGS. 4-7 and described below.

In some examples, the validating performed by the microcontrollers and secure element as part of operation 262 includes validating that the firmware of the microcontrollers has not been changed. For example, the microcontrollers may take actions to validate their own firmware. One example implementation of this is found in method 500 illustrated in FIG. 5 and described below. As another example, the microcontrollers may validate one another's firmware. One example implementation of this is found in method 700 illustrated in FIG. 7 and described below.

As noted above, the validation performed as part of operation 262 may include validating the identity of the other components or validating the firmware of the microcontrollers. In some examples, both of these types of validation are performed together as part of validation of operation 262. In other words, validating the components could include validating their identity, validating their firmware, or both.

As noted above, operation 262 is performed at power on. More specifically, this means that operation 262 is performed by the primary and secondary microcontrollers and by the secure element in response to a power on sequence being initiated. The power on sequence is a process performed by the PSU, under the direction of the microcontrollers, in response to being turned on. At the initiation of the power on sequence, main system power is not yet supplied by the PSU to the system. However, during the power on sequence the PSU microcontrollers are powered on via auxiliary power carried on an auxiliary rail (also called a standby rail in some systems), which is automatically generated by the PSU and used to power the microcontrollers. In some cases, this auxiliary power is not generated prior to the initiation of the power on sequence, and the power on sequence begins automatically when this auxiliary power starts to be generated. In other words, the microcontrollers may be configured to automatically start the power on sequence in response to first receiving input power after having been powered off. For example, if the PSU was previously not receiving any input power and then starts receiving input power, the auxiliary power may start being generated automatically from the input power, which turns on the microcontrollers and causes them to begin the power on sequence. In other cases, the power on sequence may begin in response to some other input, such as an on button being pressed, and in some cases auxiliary power is already being generated prior to the beginning of the power on sequence (e.g., in some cases, auxiliary power may continue to be generated even when the system is off). Regardless of whether the power on sequence begins in response to the microcontrollers receiving input power or in response to some other input, immediately after the initiation of the power on sequence, the microcontrollers are operational and begin performing various processes to prepare the PSU to supply main system power and to ensure everything is in order, and only upon completion of the power on sequence is main system power supplied by the PSU to the system.

Sequence A of method 200 further comprises operation 263. Operation 263 comprises making completion of the power on sequence (and hence the supply of main system power to the external system) conditional on the successful validation of each of the microcontrollers and the secure element in operation 262. More specifically, operation 263 includes allowing the power on sequence to complete if (i.e., on the condition that) all of the microcontrollers and the secure element are successfully validated in operation 262, and preventing the completion of the power on sequence if (i.e., on the condition that) any one of the microcontrollers and the secure element is not validated in operation 262. In addition, an error may be signaled by the microcontrollers (e.g., an error flag may be set) if any one of the microcontrollers and the secure element is not validated in operation 262. In addition, if the secure element is unable to validate the microcontroller connected directly thereto, the secure element may refuse to respond to authenticate requests from the system, and thus the system may raise its own error signal as a result.

Now considering sequence B, operation 264 comprises, in response to a microcontroller receiving (e.g., from the external system) a new firmware image for updating the microcontroller's firmware, using the secure element to validate the new firmware image. The secure element may have been provisioned with certificates and/or other system cryptographic information, and the secure element may use this system cryptographic information to validate the firmware image. In particular, the firmware image may be accompanied by a signature, and in operation 264 the microcontroller that receives the new firmware update may forward information about the firmware update (including the signature) to the secure element and ask the secure element to verify its authenticity. In response, the secure element may validate the signature and respond to the microcontroller with the results. Example implementations of operation 264 are found in methods 800 and 900 illustrated in FIGS. 8 and 9 and described below.

Sequence B of method 200 further comprises operation 265. Operation 265 comprises making acceptance of the received firmware update conditional on the successful validation of the new firmware image by the secure element in operation 264. More specifically, this means that if the secure element indicates the signature is valid, then the microcontroller accepts the firmware update, but if the secure element indicates the signature is invalid, then the microcontroller discards the firmware image.

Figure 3:
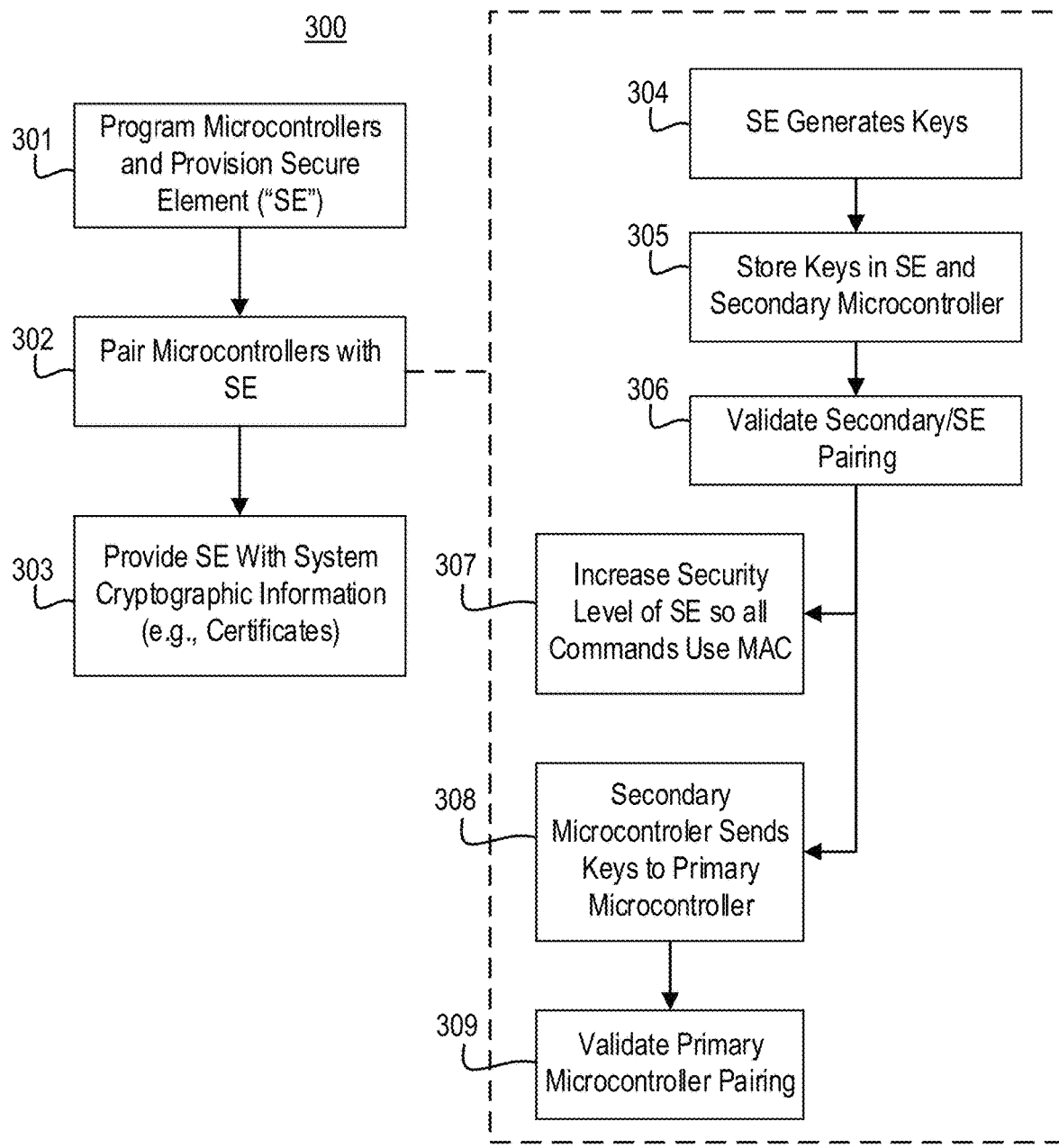
FIG. 3 is a process flow chart illustrating a second example method for configuring security logic of the power supply unit of FIG. 1.

Turning now to FIG. 3, the method 300 will be described. As noted above, the method 300 is one example of how the microcontrollers and secure element of a PSU may be provisioned and paired together in operation 261 of method 200. Method 300 may be performed in a secure environment by trusted entities, such as at the factory during manufacture/assembly of the PSU.

Method 300 begins at operation 301, which comprises programming the microcontrollers and provisioning the secure element. Programing the microcontrollers may be done, for example, via debug or programming pins thereof, and may include loading firmware images to the microcontroller and/or setting parameters or other configuration settings. In some examples, the microcontrollers are capable of preventing access to their memory via external means, for example by disabling their debug/programming pins, and in some examples the microcontrollers may be commanded to carry out the disabling of the debug/programming pins after the initial programing is completed.

The method then proceeds to operation 302, which comprises pairing the microcontrollers and secure element with one another. Depending on the type of secure element that is used, the pairing process may vary. However, one example of the paring process of operation 302 is illustrated in operations 304 to 309.

Operation 304 comprises the secure element generating keys, which form the pairing information described above, using a cryptographic key generation algorithm included in the secure element.

In operation 305, these keys are shared by the secure element with the secondary microcontroller connected directly to the secure element, and the secure element and secondary microcontroller each stores a copy of the key. Note that while the microcontrollers generally do not have sufficient storage space to store all the keys that may be needed for security, the generally do have sufficient storage space to store one or a few keys, and it is generally not a problem for the microcontrollers to store the pairing key.

Operation 306 comprises the secure element and secondary microcontroller validating the pairing. This may comprise, for example, the microcontroller and the secure element each generating a MAC based on the pairing key and sending the MAC to the other component, and if each received MAC is valid then this indicates the pairing was successful. If the pairing was unsuccessful, then an error may be indicated and a new pairing may be attempted. If the pairing was successful, then the process continues to operations 307 and 308, which may be performed concurrently or in any order.

In operation 307, the security level of the secure element is increased, which results in the secure element no longer accepting communications or commands that do not have a valid MAC (a MAC generated based on the pairing key). In other words, after the security level is increased in operation 307, only the devices which have the pairing key will be able to communicate with the secure element.

In operation 308, the secondary microcontroller sends a copy of the key to the primary microcontroller (or to each of the other microcontrollers if more are present). The primary microcontroller (or other microcontrollers) store the copy of the key.

In operation 309, the primary microcontroller and secondary microcontroller validate the pairing in a similar manner as in operation 306.

After the pairing is complete, the process continues to operation 303, which comprises providing the secure element with system cryptographic information that the secure element may need in order to perform its various functions. This cryptographic information may comprise keys, certificates, or other information used by the external system (e.g., BMC) for authentication. For example, firmware updates provided by the system may be accompanied by a signature, and the secure element may require keys and/or certificates in order to authenticate this signature, and such keys/certificates may be part of the system cryptographic information that is provided to the secure element in operation 303. In addition, the system (e.g., BMC) may perform its own authentication of the PSU (and other components of the system) upon startup to ensure that counterfeit components are not present, to detect unauthorized changes to configurations or settings, and/or to detect other threats, and the secure element may be given the responsibility of responding to authentication requests from the system. Thus, the system cryptographic information may also include information (e.g., keys, certifications, etc.) that may be needed in order to facilitate this system authentication of the PSU.

Figure 4:
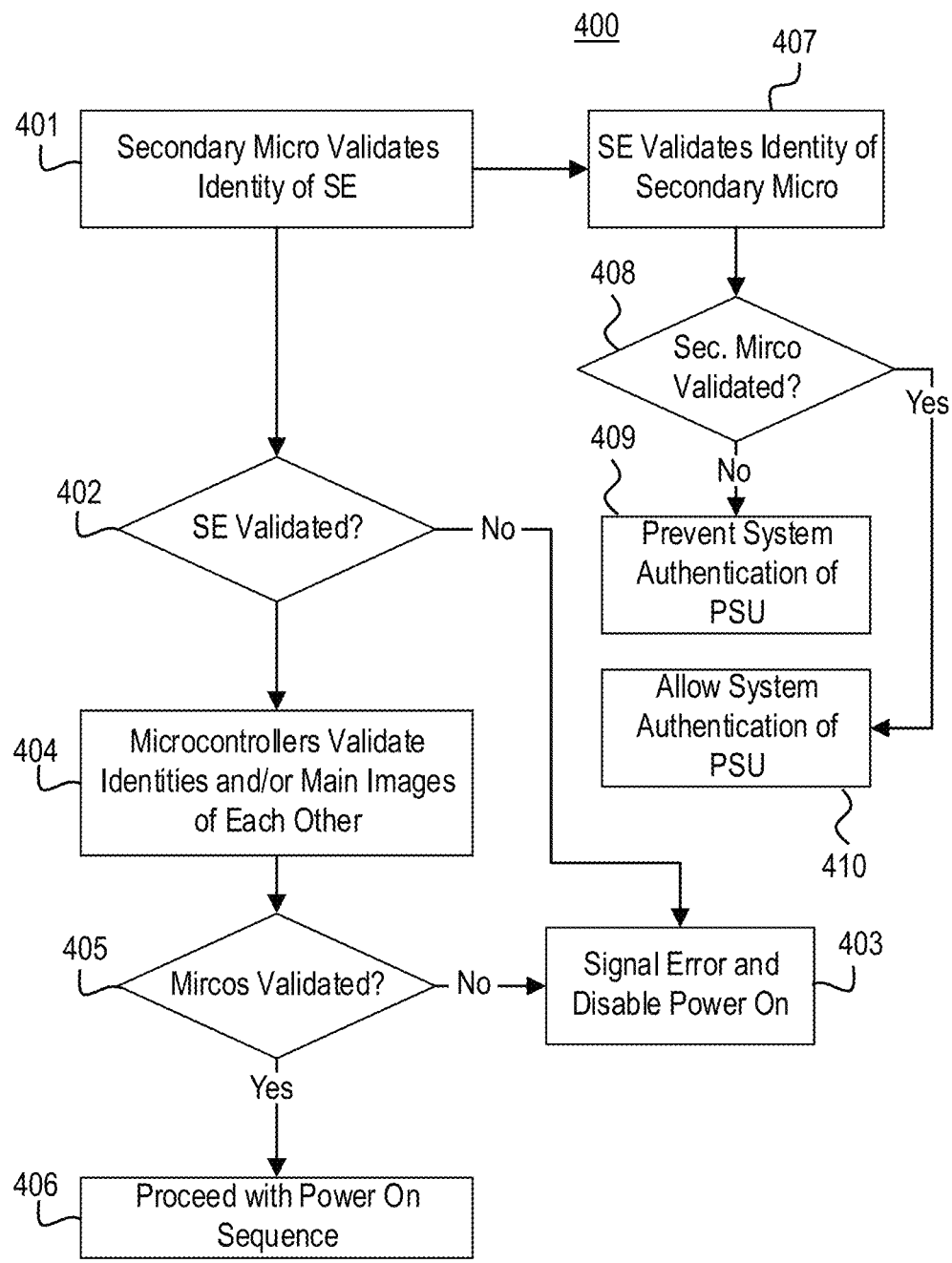
FIG. 4 is a process flow chart illustrating a third example method performable by another example implementation of security logic of the power supply unit of FIG. 1.

Turning now to FIG. 4, method 400 will be described. As noted above, method 400 comprises a specific example of operations 262 and 263 of method 200. That is, method 400 comprises one example of the microcontrollers and secure element being validated. In this example, the validation comprises validation of the identity of the components. In particular, in operation 401, the secondary microcontroller that is directly connected to the secure element validates the identity of the secure element. This validation may comprise, for example, the secondary microcontroller sending the secure element a message with a MAC generated based on the microcontroller's stored version of the shared pairing key, and the secure element returning a message with a MAC generated based on the secure element's stored version of the shared pairing key. The communications from the secondary microcontroller to the secure element as part of the validation thereof may also be simultaneously used by the secure element to concurrently validate the secondary microcontroller. In particular, as already noted above, in some examples the secure element is configured to require valid MACs for each received communication/command, and thus whenever the secondary microcontroller communicates with the secure element the secure element may validate the microcontroller using these MACs. This will be described in greater detail below in relation to operation 407. In operation 402, the microcontroller may then determine if the secure element is valid by determining whether a returned MAC sent by the secure element matches a MAC derived by the microcontroller from the same return message and the stored key. If the MACs match, then the microcontroller determines that the secure element is valid and the process goes down the "Yes" branch to operation 404. If, on the other hand, the returned MAC does not match the expected match, then the microcontroller determines that the secure element is invalid and the process goes down the "No" branch to operation 403.

In operation 403, the microcontroller signals that an error has occurred and disables the completion of the power on sequence. This operation may be reached, for example, when one of the microcontrollers or the secure element is not part of the original group of paired device—i.e., when one of the originally paired devices has been replaced with an imposter or counterfeit device.

In operation 404, which is reached if the secure element has been successfully validated by the secondary microcontroller connected thereto, the other microcontrollers all validate one another's identities. For example, assuming for ease of description that there are just two microcontrollers (i.e., primary and secondary microcontrollers), the secondary microcontroller may send a message with a MAC to the primary microcontroller and the primary microcontroller may responds with a reply message and a reply MAC. In operation 405, each of these microcontrollers may determine whether the other microcontroller is valid by comparing the received MAC to an expected MAC, which the receiving microcontroller derives from the message and the previously stored pairing key. If the received MAC does not match the expected MAC, the receiving microcontroller determines that the sending microcontroller is not valid and the process continues down the "no" branch to operation 403. If the received MAC does match the expected MAC, the receiving microcontroller determines that the sending microcontroller is valid and the process continues down the "yes" branch to operation 406.

In operation 406, the microcontrollers all allow the power on sequence to proceed in the normal fashion. This operation is reached only if all of the microcontrollers and the secure element have had their identities successfully validated.

In operation 407, the secure element validates the identity of the secondary microcontroller. This operation may occur concurrently with operation 401, and may be triggered by the secure element receiving communications from the secondary microcontroller as part of the secondary microcontroller attempting to validate the secure element in operation 401. For example, as noted above the secondary microcontroller may send the secure element a message with a MAC, and in operation 407 the secure element may validate the identity of the secondary microcontroller by avoiding the received MAC based on the shared pairing key.

In operation 408, if the identity of the secondary microcontroller is invalid, then the process continues to operation 409 and the secure element prevents the authentication by the system of the PSU. This may comprise, for example, the secure element refusing to respond to requests by the system to authenticate the PSU. This will signal to the system controller that there is a problem, and the system controller may signal an error and/or take other protective or corrective actions, such as preventing powering on of other components or commanding a shutdown if power on has already occurred. On the other hand, if in operation 408 the identity of the secondary microcontroller is valid, then the process continues to operation 410 and the secure element allows and facilities the authentication of the PSU by the system, e.g., by responding to authentication requests from the system.

Figure 5:
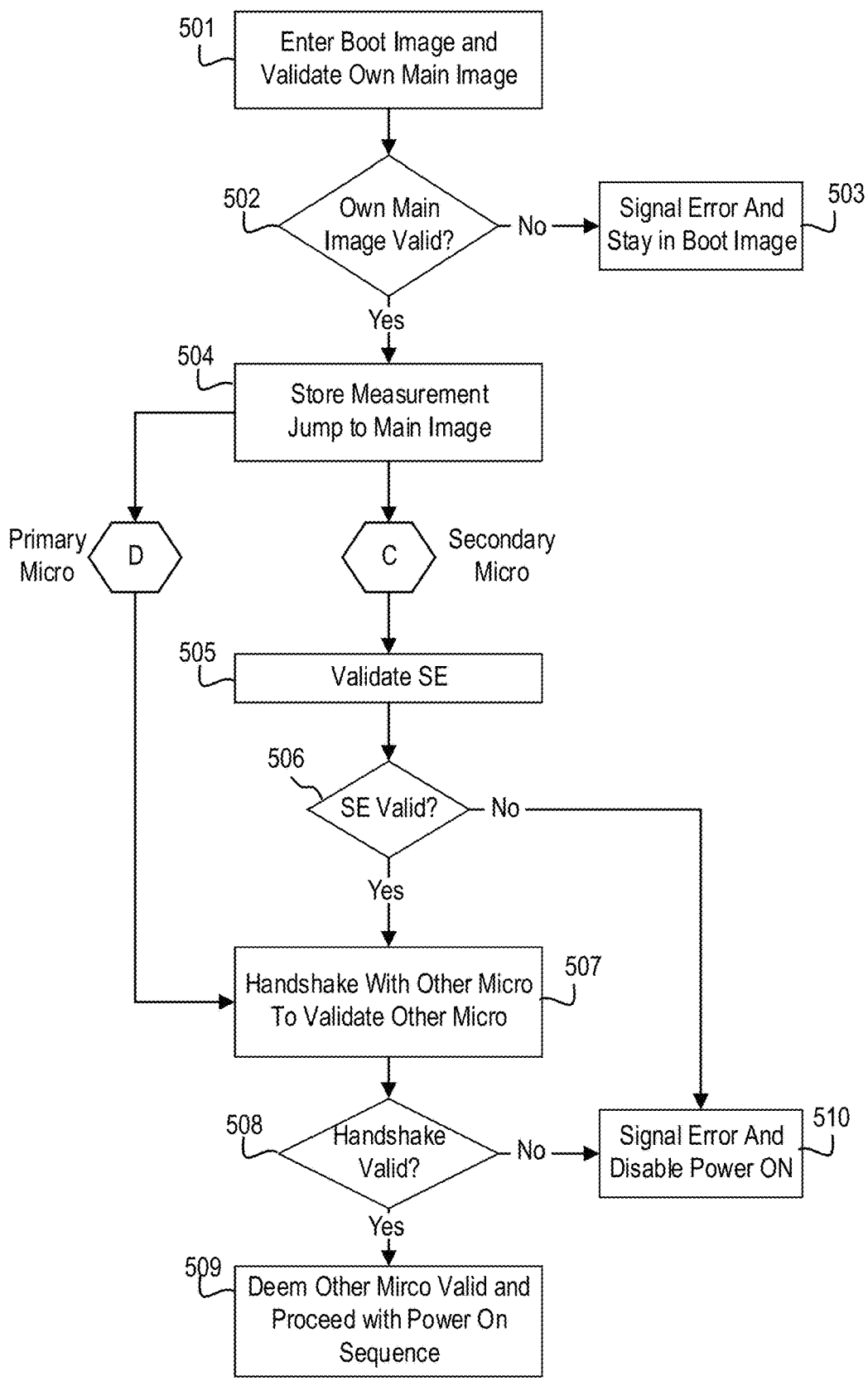
FIG. 5 is a process flow chart illustrating a fourth example method performable by another example implementation of security logic of the power supply unit of FIG. 1.

Turning now to FIG. 5, the method 500 will be described. Like the method 400, the method 500 comprises a specific example of operations 262 and 263 of method 200. That is, method 500 comprises one example of the microcontrollers and secure element being validated. In this example, the validation comprises the microcontrollers validating their own firmware image, in addition to performing additional validation of the other components. Operations 501 through 504 are performed by each of the microcontrollers. After operation 504, the process diverges into sequences C and D depending on which microcontroller is performing the method—the secondary microcontroller which is directly coupled to the secure element follows sequence C, whereas the primary microcontroller (or any other microcontrollers if present) follow sequence D. Sequences C and D reunite at operation 507, and operations 507 through 510 are thus performed by all of the microcontrollers.

In operation 501, the microcontroller enters its boot image and validates its own main image. This operation is performed in response to the microcontroller being initialized or powered on. Each of the microcontrollers may have two distinct firmware images saved in its memory, with one of the images being a boot image comprising a bootloader which the microcontroller automatically executes upon initially booting up (i.e., after being powered on) and the other being the main firmware image that comprises the firmware that is run during normal operation of the microcontroller, with the bootloader causing the main image to be executed after performing some initial operations. The boot image is saved in a section of memory that is immutable and which is measurable via hardware to ensure that no alternation to this section of memory has occurred. In contrast, the main firmware image is saved in a different section of memory that can be changed, in order to allow for firmware updates when needed. The immutability of the section of memory in which the boot image is stored, in combination with the disabling of the debug/programming pins, ensures that the boot image cannot be changed and allows the bootloader to be a trusted entity which can be relied upon to validate the main firmware image. In particular, the bootloader is configured to, upon being executed, measure the main firmware image using a cryptographic hashing algorithm, and compare the resulting hash value to an expected hash value (which was previously measured from the main firmware image) to ensure the main firmware has not changed since the last measurement.

In operation 502, the bootloader determines if the main image is valid based on whether the aforementioned hash values match. If the hash values do not match, then the main image is not valid and the boot loader proceeds down the "No" path to operation 503. If the hash values do match, then the main image is valid and the boot loader proceeds down the "Yes" path to operation 504.

In operation 503, the bootloader signals an error and stays within the boot image, refraining from launching the main firmware image.

In operation 504, the bootloader stores the measurement (the hash value) for subsequent comparisons and then jumps to (i.e., executes) the main firmware image. Once the main firmware image is launched, the method 500 may diverge down sequences C and D, depending on which microcontroller is performing the method, as noted above.

Considering sequence C, which is followed by the secondary microcontroller that is coupled to the secure element, operation 505 comprises validating the secure element. This validation may comprise validating the identity of the secure element, similar to operation 401 described above. In operation 506, if the secure element is determined to be valid, then the process continues down the "Yes" path to operation 507. If the secure element is determined to be invalid, then the process continues down the "No" path to operation 510.

In operation 510, the microcontroller may signal an error and disable the completion of the power on sequence. Operation 510 is reached when one of the microcontrollers determines the secure element or another one of the microcontrollers to be invalid, and is performed by the microcontroller that made this determination. For example, if the secondary microcontroller determines the secure element to be invalid in operation 506, then operation 510 is performed by the secondary microcontroller. As another example, if the primary microcontroller determines the secondary microcontroller to be invalid in operation 508 (described below), then the primary microcontroller may perform operation 510. Either microcontroller can, on its own, prevent the power on sequence from completing and disable the supply of power to the system.

Returning to operation 507, which is performed by both secondary and primary microcontrollers, each of the microcontroller executes a handshake with the other microcontrollers to validate the other microcontrollers. The handshake may include exchanging information, such as MACs, and each of the microcontrollers may determine in operation 508 if the handshake was valid based on the exchanged information. If the handshake was valid (e.g., the received MAC matches an expected MAC), then the method continues down the "Yes" path to operation 509. If the handshake was invalid (e.g., the received MAC does not match the expected MAC), then the method continues down the "No" path to operation 510.

In operation 509, the microcontroller deems the other microcontroller to be valid, because the handshake was valid. Accordingly, because the other microcontroller was deemed valid, the microcontroller proceeds with allowing the power on sequence to occur. Of course, as noted above, a single microcontroller can prevent the power on sequence, and thus the power on sequence will only proceed if both of the microcontrollers decide in operation 509 to proceed with the power on sequence.

Figure 6:
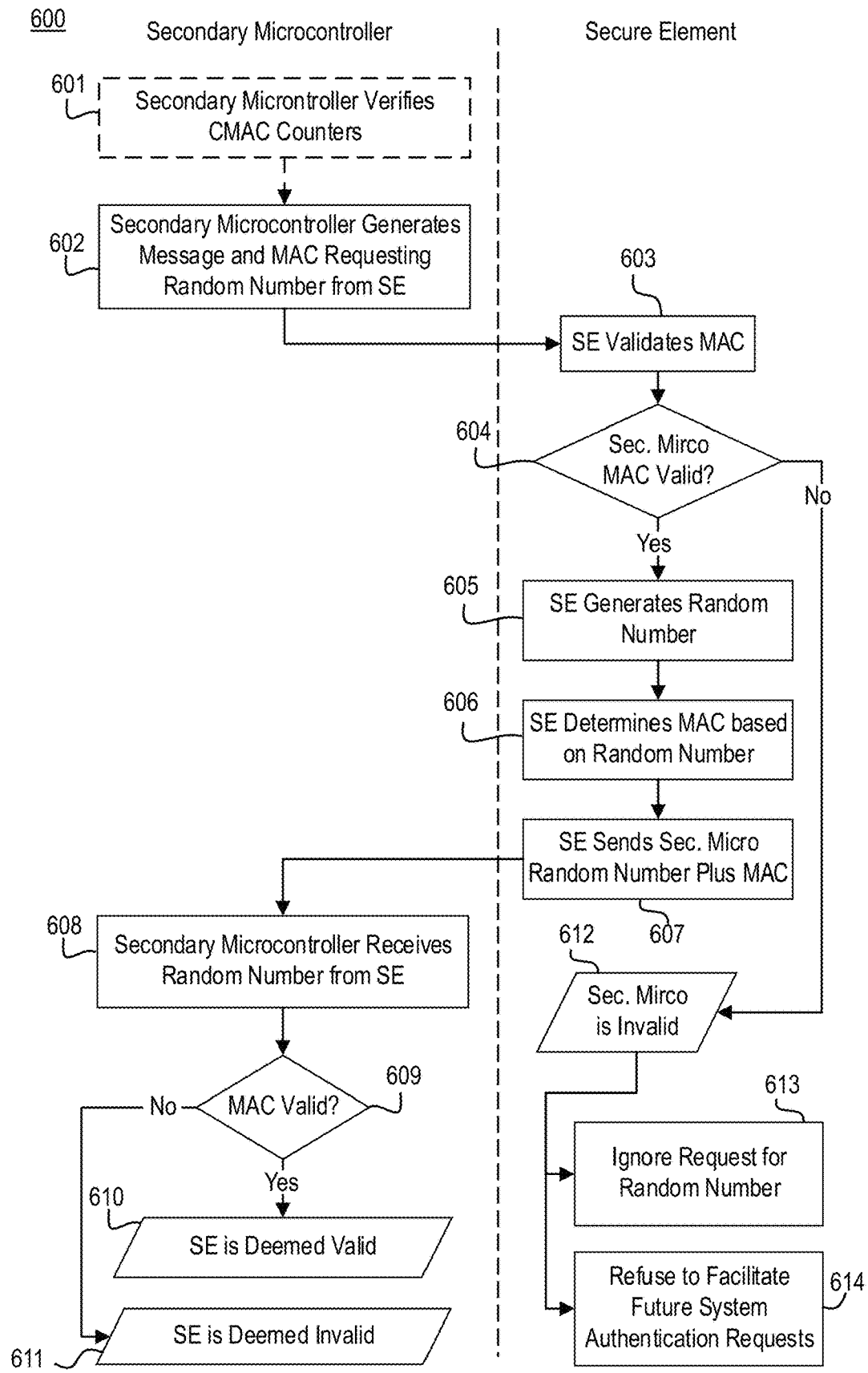
FIG. 6 is a process flow chart illustrating a fifth example method performable by another example implementation of security logic of the power supply unit of FIG. 1.

Turning now to FIG. 6, the method 600 will be described. The method 600 comprises a specific example of operations 401 and 402 of method 400 and of operations 505 and 506 of method 500. That is, method 600 comprises a more specific example of how the secure element may be validated. Some of the operations of the method 600 are performed by the secondary microcontroller that is coupled to the secure element, and others are performed by the secure element, and these operations are separated by the dashed line in FIG. 6.

Operation 601 is an optional operation, and thus is indicated in dashing. Operation 601 comprises the secondary microcontroller verifying MAC counters. Such MAC counters may be counters of the number of MAC-containing messages sent between the secondary microcontroller and the secure element. The secondary microcontroller may keep track of this in its own MAC counter, and the secure element may also keep track of this in its own MAC counter, and validating the MAC counters may comprise comparing the two values to see if they match. If the MAC counters match, there is no problem and the process may proceed to operation 602. However, if the MAC counters do now match, some protective or corrective action may be needed. The MAC counters not matching could be indicative of malicious activity, and thus, in some examples, the microcontroller may proceed from operation 601 to operation 609 if the MAC counter of the secure element does not match the microcontrollers stored MAC counter.

In operation 602, the secondary microcontroller generates and sends a message and a corresponding MAC ("first MAC") to the secure element, with the message comprising a request to the secure element for the secure element to generate a random number (the secure element may comprise a random number generator as part of its cryptographic functions). The first MAC is generated by the secondary microcontroller based on the message and on the copy of the shared pairing key stored by the secondary microcontroller.

In operation 603, the secure element validates the first MAC received from the secondary microcontroller. For example, the secure element may generate its own MAC based on the received message and based on the secure element's copy of the pairing key ("second MAC"), and then compare the generated second MAC with the received first MAC.

In operation 604, if the received first MAC is valid (i.e., first MAC matches second MAC), the process continues to operation 605, whereas if the received first MAC is invalid (i.e., first MAC does not match second MAC) then the process continues to operation 612.

In operation 605, the secure element generates the random number.

In operation 606, the secure element determines another MAC ("third MAC") based on the random number and using the stored pairing key.

In operation 607, the secure element sends the secondary microcontroller a message comprising the random number generated in operation 605 together with the corresponding third MAC generated in operation 606.

In operation 608 the secondary microcontroller receives the message with the random number and third MAC from the secure element.

In operation 609, the secondary microcontroller determines whether the received third MAC is valid. This may comprise the secondary microcontroller generating another MAC based on the received random number and based on its stored version of the pairing key ("fourth MAC"), and determining whether the received third MAC matches the generated fourth MAC. The received third MAC is considered as being valid if it matches the generated fourth MAC, because the only feasible way for the secure element to have generated the same MAC as the microcontroller would be if they both generated the MACs using the same random number and the same key, and if the secure element has the same key as the microcontroller then this indicates it is the same secure element with which the microcontroller was previously paired. Thus, if the third MAC received from the secure element matches the fourth MAC determined by the secondary microcontroller (MAC is valid), then the process continues to operation 610 in which the microcontroller deems the secure element as being valid. On the other hand, if the third MAC received from the secure element does not the fourth MAC determined by the secondary microcontroller (MAC is invalid), then the process continues to operation 609 in which the microcontroller deems the secure element as being invalid.

In operation 612, which is performed if the first MAC is determined to be invalid in operation 604, the secure element deems the secondary microcontroller to be invalid. Accordingly, the secure element may then perform operations 613 and 614 in any order (including concurrently).

In operation 613, the secure element ignores the request from the secondary microcontroller to provide the random number.

In operation 614, the secure element refuses to facilitate the authentication of the PSU by the system controller. For example, the secure element refuses to respond to future requests by the system controller for authentication.

Figure 7:
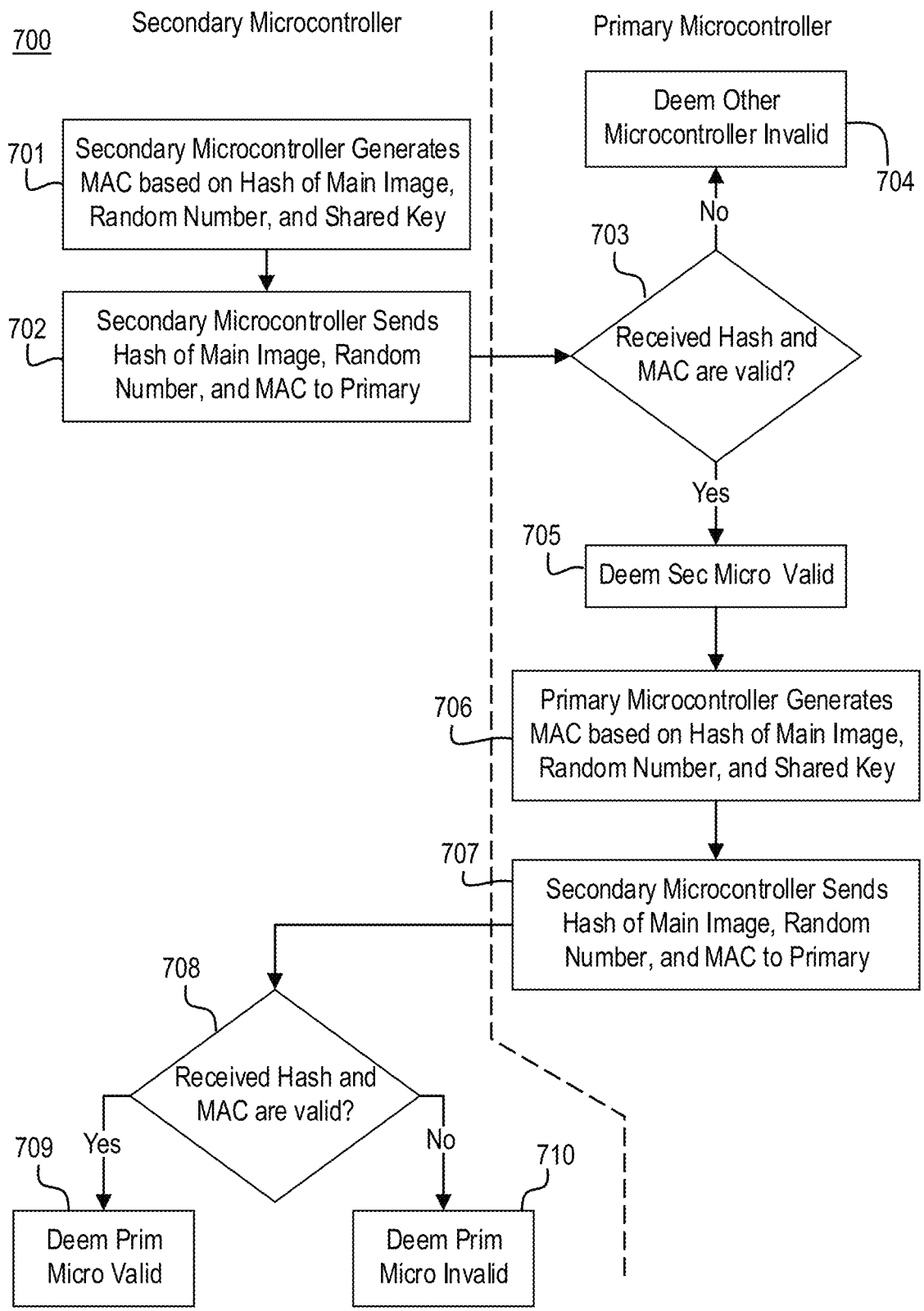
FIG. 7 is a process flow chart illustrating a sixth example method performable by another example implementation of security logic of the power supply unit of FIG. 1.

Turning now to FIG. 7, the method 700 will be described. The method 700 comprises a specific example of operations 404 and 405 of method 400 and of operations 507 and 508 of method 500. That is, method 700 comprises a more specific example of how the microcontroller may validate one another, or in other words a more specific example of a handshake that can be used to validate the microcontrollers. In this example, the validation of the microcontrollers comprises both a validation of their identity and a validation of their respective main firmware images. Moreover, in some examples, method 700 may be performed after method 600 has been performed.

In operation 701, the secondary microcontroller generates a MAC based on a hash of its main firmware image, the random number received from the secure element, and the shared pairing key. In some examples, this random number may be the same random number that was received by the secondary microcontroller in operation 606 of method 600. In some examples, the hash of the main firmware image may have been generated previously, for example in operation 501 of method 500.

In operation 702, the secondary microcontroller sends a message comprising the hash of its main firmware image and the random number, together with the corresponding MAC, to the primary microcontroller.

In operation 703, the primary microcontroller determines whether the whether the received hash and MAC are valid. The received hash is determined to be valid if it matches an expected hash stored by the primary microcontroller. The expected hash corresponds to a hash of the secondary microcontroller's main image which was taken at a previous date and stored by the primary microcontroller (e.g., as part of a previous validation operation). Thus, the current hash of the main firmware image of the secondary microcontroller may be deemed valid by the primary microcontroller if and only if the main firmware image of the secondary microcontroller has not changed since the last time the primary microcontroller checked it (e.g., since the last power on). The MAC is validated in the same way as described above in relation to operation 607, i.e., the primary microcontroller generates another MAC based on the received hash, the random number, and the shared pairing key and determines if the received MAC matches the generated MAC.

If the received Hash and MAC are both valid, then the process continues along the "Yes" path to operation 705, wherein the primary microcontroller deems the secondary microcontroller to be valid (i.e., both the firmware and the identity of the secondary microcontroller are invalid). If, on the other hand, either one of the received Hash or MAC are invalid, then the process continues along the "No" path to operation 704, wherein the primary microcontroller deems the secondary microcontroller to be invalid (i.e., either the firmware, the identity, or both the firmware and the identity of the secondary microcontroller are invalid).

In operation 706, the primary microcontroller generates a MAC based on a hash of its main firmware image, the received random number, and the shared pairing key. In some examples, the hash of the main firmware image may have been generated previously, for example in operation 501 of method 500.

In operation 707, the primary microcontroller sends a message to the secondary microcontroller comprising the hash, the random number, and the MAC.

In operation 700, the secondary microcontroller determines whether the main image hash and the MAC it received from the other microcontroller are valid, in the same manner as already described above in relation to operation 703.

If the received Hash and MAC are both valid, then the process continues along the "Yes" path to operation 709, wherein the secondary microcontroller deems the primary microcontroller to be valid. If, on the other hand, either one of the received Hash or MAC are invalid, then the process continues along the "No" path to operation 710, wherein the secondary microcontroller deems the primary microcontroller to be invalid. As noted above, in some examples the method 700 corresponds to a "handshake" between the microcontrollers, and this handshake may be valid if both microcontrollers deem the other microcontroller to be valid in operations 709 and 705, whereas the handshake may be invalid if either one of the microcontrollers determines the other microcontroller to be valid.

Figure 8:
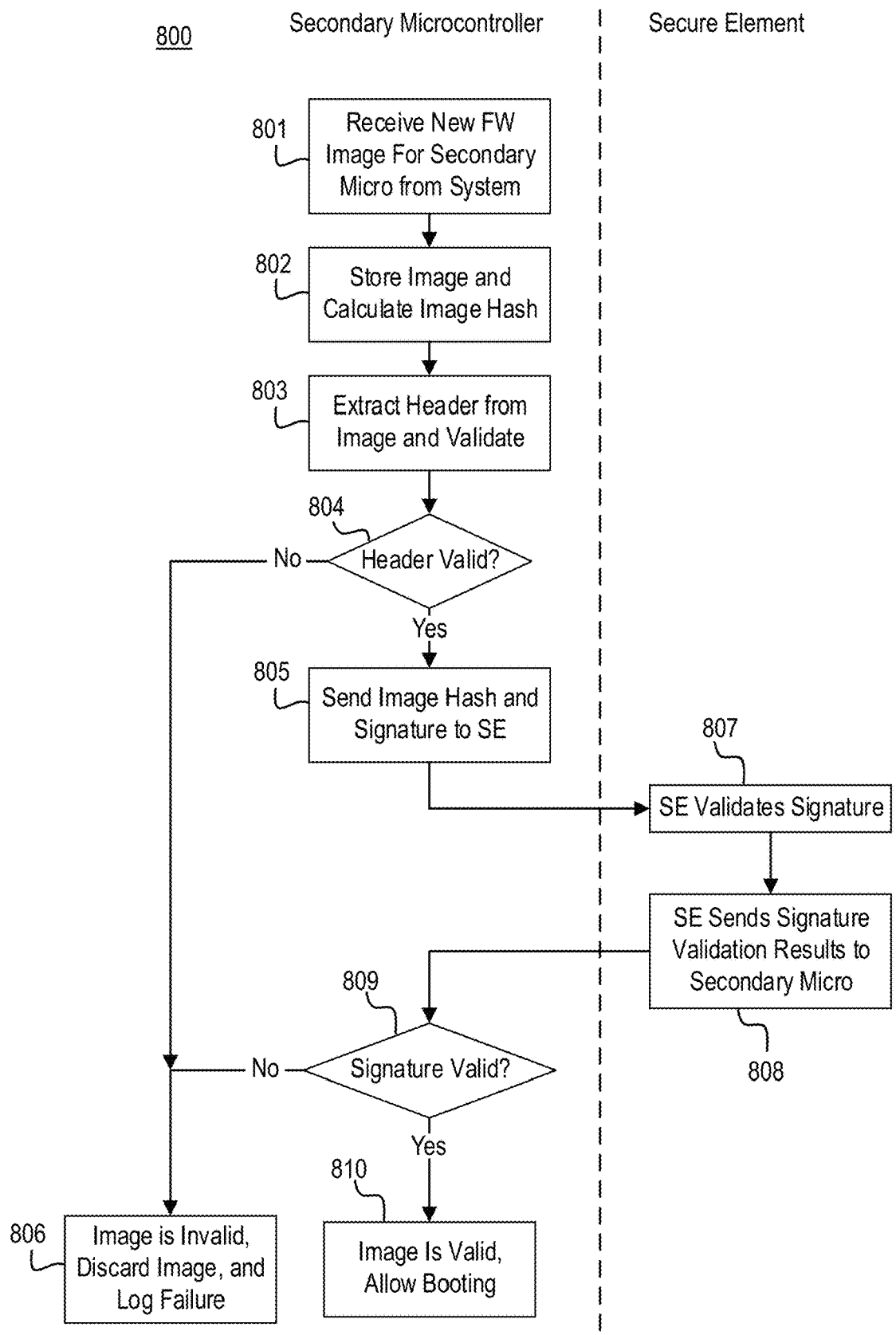
FIG. 8 is a process flow chart illustrating a seventh example method performable by another example implementation of security logic of the power supply unit of FIG. 1.

Turning now to FIGS. 8 and 9, methods 800 and 900 will be described. The methods 800 and 900 comprise specific examples of operations 264 and 265 of method 200. That is, methods 800 and 900 comprises more specific examples of how the secure element may be used to validate firmware updates received from the system for the microcontrollers. Method 800 is an example in which the secondary microcontroller which is connected directly to the secure element is the target of the firmware update, whereas method 900 is an example in which the primary microcontroller is the target of the firmware update. The methods 800 and 900 comprise some similar operations, but because the primary microcontroller is not coupled directly to the secure element additional operations are needed when the primary microcontroller is the target of the update (with most of these additional operations pertaining to the secondary microcontroller forwarding messages between the other components). In some examples, methods 800 and 900 are performed after the microcontrollers and secure element have all been successfully validated, and therefore it can be assumed in these examples that the microcontrollers and secure elements are all trusted entities.

Considering first the method 800 in FIG. 8, in operation 801 the secondary microcontroller receives a new firmware image intended for updating the main firmware of the secondary microcontroller, together with an accompanying signature. This new firmware image may be received from the external system (e.g., from the BMC) via the system communication interface 155. However, in some cases it cannot be safely assumed that the firmware update is genuine merely because it is received from the external system, as it may be possible in some cases that the external system is itself compromised. Thus, an important function of the secure element in some examples may be to validate any new firmware updates based on system cryptographic information that was provided to the secure element at pairing (e.g., in operation 303 of method 300).

In operation 802, in response to determining that the new firmware image is intended for the secondary microcontroller, the secondary microcontroller stores the firmware image and calculates a hash of the image.

In operation 803, the secondary microcontroller extracts the header from the image and validates the header. In operation 804, if the header is valid, the process continues down the "yes" branch to operation 805, which results in further validation of the entire image being performed using the secure element in operations 805 through 810. If the header is invalid, the process continues down the "no" branch to operation 806, wherein the microcontroller determines that the firmware image is invalid, discards the image (i.e., does not implement the update and deletes the image), and logs a failure.

In operation 805, the microcontroller sends the hash of the image and a signature of the image (which accompanied the image sent from the system) to the secure element and requests that the secure element validate the signature. Although not illustrated, the microcontroller also may generate and send a MAC along with the message, with the MAC being generated based on the message and the stored pairing key. This is because, in some examples the secure element is configured to require a valid MACs for each received communication/command.

In operation 807, the secure element validates the received signature. The secure element may, for example, use system cryptographic information (e.g., keys, certificates, etc.) that was previously stored in the secure element to validate the signature. Although not illustrated, in some examples, the performance of operation 807 may be conditional upon the successful validation of a MAC accompanying the request.

In operation 808, the secure element sends the results of the signature validation to the secondary microcontroller. The results of the signature validation may be, for example, an indication of whether the signature is valid or invalid.

In operation 809, the secondary microcontroller considers the signature validation results and determines whether the signature is valid or invalid based on the signature validation results received from the secure element. If the signature is valid, then the process continues down the "yes" branch to operation 810, wherein the microcontroller determines that the entire image is valid (because the signature is valid) and therefore allows that new image to be booted into and the update process to proceed. If the signature is invalid, then the process continues down the "no" branch to operation 806, which was described above.

Now considering the method 900 in FIG. 9, the process is similar to the method 800 except that the firmware update is intended for the primary microcontroller and the secondary microcontroller acts as an intermediary between the secondary microcontroller, the system, and the secure element.

In operation 901, the secondary microcontroller receives, from the external system (e.g., BMC), a new firmware image which is intended for updating the firmware of the primary microcontroller, together with an accompanying signature.

In operation 902, in response to determining that the firmware update is for the primary microcontroller, the secondary microcontroller forwards the new firmware image (and accompanying signature) to the primary microcontroller.

In operations 903 to 905, the primary microcontroller stores the image, calculates a hash thereof, extracts a header from the image, and validates the header. These operations are similar to the operations 802 to 804 in method 800.

If it is determined in operation 905 that the header is invalid, the process continues to operation 906. If the header is valid, the process continues to operation 907. In operation 907, the primary microcontroller sends the image hash and the signature to the secondary microcontroller. Operation 907 is similar to operation 805, except that in operation 907 the hash and signature are not sent directly to the secure element because the primary microcontroller is not connected directly thereto, and thus the message is instead sent to the secondary microcontroller.

In operation 908, the secondary microcontroller forwards the received hash and signature on to the secure element and requests that the secure element validate the signature. In some example, the secondary microcontroller may recognize that it needs to forward the message to the secure element based on the type of message or based on an instruction included with the message. Although not illustrated, the microcontroller also may generate and send a MAC along with the message, with the MAC being generated based on the message and the stored pairing key. This is because, in some examples the secure element is configured to require a valid MACs for each received communication/command.

In operations 909 and 910, the secure element validates the signature and sends the results to the secondary microcontroller. These operations are similar to operations 807 and 808 of method 800. Although not illustrated, in some examples, the performance of operation 909 and 910 may be conditional upon the successful validation of a MAC accompanying the request.

In operation 911, the secondary microcontroller forwards the results of the signature validation to the primary controller.

In operations 912, 906, and 913, the primary microcontroller determines whether the signature is valid based on the received signature validation results, and either discards the image if the signature is invalid (operation 906) or allows the image to be booted and the update to proceed if the signature is valid (operation 913). These operations are similar to operations 809, 806, and 810 of method 800.

Note that the method 900 may also be performed by other microcontrollers besides the primary microcontroller. In particular, the method 900 may be used to validate a firmware update for any microcontroller other than the secondary microcontroller that is directly connected to the secure element. Thus, for example, additional secondary microcontrollers (if any are present) which are not directly connected to the secure element may utilize the method 900 for validating firmware updates, in which case the references in FIG. 9 to "primary microcontroller" should be understood as referring, mutatis mutandis, to this additional secondary microcontroller and the references to the "secondary microcontroller" should be understood as referring to the one secondary microcontroller that is directly connected to the secure element.

In the description above, various types of electronic circuitry are described. As used herein, "electronic" and "electrical" are intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Provide: As used herein, to "provide" an item means to have possession of and/or control over the item. This may include, for example, forming (or assembling) the item from its constituent materials and/or obtaining possession of and/or control over an already-formed item.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A power supply unit (PSU) for installation in an electronic system, comprising:

power conversion circuitry configured to convert input power input into the PSU into output power to be outputted from the PSU to the electronic system in an installed state of the PSU in the electronic system;

a plurality of microcontrollers configured to control operations of the power conversion circuitry;

a secure element communicably connected to a first microcontroller of the plurality of microcontrollers, wherein the secure element and the plurality of microcontrollers are all paired together with each storing shared pairing information;

wherein the secure element and the plurality of microcontrollers comprise security logic configured to:

in response to a power on sequence being initiated, validate the secure element and each of the plurality of microcontrollers based at least in part on the shared pairing information, and make completion of the power on sequence conditional on successful validation of the secure element and the plurality of microcontrollers; and/or in response to receiving a new firmware image for updating one of the plurality of microcontrollers, use the secure element to validate the new firmware image and make acceptance of the new firmware image conditional on successful validation of the new firmware image.

2. The PSU of claim 1, wherein the security logic is configured to validate the secure element and each of the plurality of microcontrollers, and the validating of the secure element and each of the plurality of microcontrollers comprises validating the identities of the secure element and each of the plurality of microcontrollers based at least in part on the shared cryptographic information.

3. The PSU of claim 2, wherein the shared pairing information comprises a key, and each of the secure elements and the plurality of microcontrollers stores a copy of the key, and wherein security logic is configured to validate the identity of the secure element by:

causing the secure element to generate a first message authentication code (MAC) based on the secure element's stored copy of the key and send the first MAC to the first microcontroller, and causing the first microcontroller to validate the first MAC based on the first microcontroller's stored copy of the key.

4. The PSU of claim 3, wherein security logic is configured to validate the identity of the first microcontroller by:

causing the first microcontroller to generate a second MAC based on the first microcontroller's stored copy of the key and send the second MAC to a second microcontroller of the plurality of microcontrollers, and causing the second microcontroller to validate the second MAC based on the second microcontroller's stored copy of the key.

5. The PSU of claim 2, wherein the security logic is configured to, as part of validating each of the plurality of microcontrollers, validate the main firmware image of each of the plurality of microcontrollers.

6. The PSU of claim 5, wherein the security logic is configured to validate the main firmware image of the first microcontroller by:

causing the first microcontroller to generate a hash of its main firmware image and send the hash to a second microcontroller of the plurality of microcontroller; and causing the second microcontroller to validate the hash.

7. The PSU of claim 5, wherein the shared pairing information comprises a key, and each of the secure elements and the plurality of microcontrollers stores a copy of the key, and wherein security logic is configured to validate the identity of the secure element by:

causing the secure element to generate a random number and a first message authentication code (MAC) based on the random number secure element's stored copy of the key and send the random number and the first MAC to the first microcontroller, and causing the first microcontroller to validate the first MAC based on the random number and the first microcontroller's stored copy of the key, wherein security logic is configured to validate the identity of the first microcontroller and validate the firmware of the first microcontroller by:

causing the first microcontroller to generate a first hash of its main firmware image, generate a second MAC based on the hash, the random number, and the key, and send the first hash, the random number, and the second MAC to a second microcontroller of the plurality of microcontrollers, and causing the second microcontroller to validate the second MAC based on the key, and validate the first hash.

8. The PSU of claim 7, wherein security logic is configured to validate the identity of the second microcontroller and validate the firmware of the second microcontroller by:

causing the second microcontroller to generate a second hash of its main firmware image, generate a third MAC based on the second hash, the random number, and the key, and send the second hash and the third MAC to the first microcontroller, and causing the first microcontroller to validate the third MAC based on the key and to validate the second hash.

9. The PSU of claim 7, wherein the security logic is configured to, in response to receiving a new firmware image for updating the first microcontroller, use the secure element to validate the new firmware image.

10. The PSU of claim 2, wherein the security logic is configured to, in response to receiving a new firmware image for updating the first microcontroller, use the secure element to validate a signature of the new firmware image.

11. The PSU of claim 1, wherein the security logic is configured to, in response to receiving a new firmware image for updating the first microcontroller, use the secure element to validate the new firmware image by:

causing the first microcontroller to generate a hash of the new firmware image and forward the hash and a signature of the new firmware image to the secure element, causing the secure element to validate the signature and return the validation results to the first microcontroller causing the first microcontroller to discard the new firmware image if the validation results are negative and to accept the new firmware image if the validation results are positive.

12. The PSU of claim 1, wherein the PSU comprises a primary side and a secondary side which are galvanically isolated from one another, wherein the power conversion circuitry comprises a primary side conversion circuitry and secondary side conversion circuitry, and wherein the plurality of microcontrollers comprise a primary side microcontroller configured to control the primary side conversion circuitry and a secondary side microcontroller configured to control the secondary side conversion circuitry.

13. The PSU of claim 12, wherein the secondary side microcontroller is the first microcontroller, and the primary side microcontroller is communicably connected to the secondary side microcontroller and communicates with the secure element through the secondary side microcontroller.

14. PSU of claim 12, further comprising:

a system communication interface configured to be communicably connected to a system controller of the electronic system in the installed state of the PSU, wherein the secondary side microcontroller is communicably connected to the system communication interface, and the primary side microcontroller is communicably connected to the secondary side microcontroller and communicates with the system controller through the secondary side microcontroller.

15. An electronic system, comprising:

a main system board comprising system controller; and the PSU of claim 1 coupled to the main system board and configured to supply the output power to the main system board, wherein the first microcontroller is communicably connected to the system controller.

* * * * *